US011070657B2

United States Patent
Joshi et al.

(10) Patent No.: US 11,070,657 B2
(45) Date of Patent: Jul. 20, 2021

(54) REMOTE TUNING AND DIAGNOSTIC INTERFACE FOR HANDS-FREE SYSTEMS

(71) Applicant: Continental Automotive Systems, Inc., Auburn Hills, MI (US)

(72) Inventors: Bijal Joshi, Schaumburg, IL (US); Matthew Robert Kirsch, Chicago, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 716 days.

(21) Appl. No.: 14/291,971

(22) Filed: May 30, 2014

(65) Prior Publication Data

US 2015/0350398 A1 Dec. 3, 2015

(51) Int. Cl.
| | | |
|---|---|---|
| *H04M 1/60* | (2006.01) | |
| *H04W 28/18* | (2009.01) | |
| *H04B 17/11* | (2015.01) | |
| *H04B 17/21* | (2015.01) | |

(52) U.S. Cl.
CPC .......... *H04M 1/6083* (2013.01); *H04B 17/11* (2015.01); *H04B 17/21* (2015.01); *H04W 28/18* (2013.01); *H04M 1/6091* (2013.01)

(58) Field of Classification Search
CPC ............. H04M 1/6083; H04M 1/6091; H04M 1/6075; H04M 9/08; H04W 28/18; H04B 17/11; H04B 17/21; H04B 3/23
See application file for complete search history.

(56) References Cited

U.S. PATENT DOCUMENTS

| | | | | |
|---|---|---|---|---|
| 9,406,310 | B2 * | 8/2016 | Dennis | ................ G10L 21/0216 |
| 2008/0031435 | A1 * | 2/2008 | Kagaya | .................. G08C 17/02 |
| | | | | 379/102.01 |
| 2011/0064232 | A1 * | 3/2011 | Ruwisch | ................. H04M 1/24 |
| | | | | 381/59 |
| 2012/0094657 | A1 * | 4/2012 | Gullapalli | ........... H04M 1/6091 |
| | | | | 455/425 |

FOREIGN PATENT DOCUMENTS

| | | |
|---|---|---|
| EP | 1883213 A1 | 1/2008 |
| JP | 2003283645 A | 10/2003 |
| WO | 2013/148094 A1 | 10/2013 |

OTHER PUBLICATIONS

Search Report dated Dec. 4, 2014, from corresponding GB Patent Application No. GB1412250.1.

* cited by examiner

*Primary Examiner* — Marcos L Torres

(57) ABSTRACT

Operating parameters of a hands-free audio system used with a wireless communication device in a moving vehicle are adjusted or tuned in real-time and requires only two persons: one to drive the vehicle and thus provide actual usage conditions with the hands-free audio system and one to remotely tune or adjust operating parameters to optimize far end audio quality. The system is remotely tuned by transmitting audio signals from the vehicle to the far end using a first communications link to the far end and sending adjustment commands to the vehicle from the far end via a second, data link between the far end and the vehicle. In one embodiment, DTMF signals received from inside or outside the vehicle can tune or be used to diagnose the hands-free system. Test measurements obtained from within and by the hands-free audio system can also be retrieved from a remote location.

9 Claims, 6 Drawing Sheets

REMOTE TUNING AND DIAGNOSTIC INTERFACE FOR HANDS-FREE SYSTEMS

BACKGROUND

Many motor vehicles are provided with "hands-free" systems, which are essentially speaker phones that enable a driver or passenger to use his or her cell phone without having to hold the device against the user's ear. They comprise a microphone and a speaker. The microphone portion is typically a non-directional microphone designed to pick up sounds from almost anywhere inside a vehicle, including a user's voice. The speaker portion is designed to provide audio at power levels that can be heard anywhere inside the vehicle.

A well-known and unfortunate characteristic of hands-free systems is their tendency to pick up background noise from inside the vehicle, a user's voice as well as audio signals, which originate from the far-end of a telephone call, output from the speaker. The background noise includes wind noise, engine noise, and road noise. A user's voice can include voice signals from anyone inside the vehicle. Audio signals output from the speaker, however, which are detected by the microphone and re-transmitted to the far end produce an undesirable sound at the far end which is known as echo.

As used herein, echo refers to the re-transmission of a portion of a received signal to its origin. Stated another way, echo is the return of a transmitted signal to its source, with a delay between the time that the signal was first transmitted from the source and a portion of the signal is returned to the source. Echo is desirable in some types of systems, such as radar. Echo in a telecommunications system, however, is annoying.

Most echo suppressors and echo cancellers are now embodied as the software that controls the operation of a digital signal processor. Most noise suppressors are also embodied as software. Optimizing echo suppression, echo cancellation, and noise suppression thus requires changing various parameters used by the processes that provide such operations.

Since a hands free system will pick up vehicle noise when the vehicle is being operated, properly tuning a hands-free system requires the vehicle to be operated while the tuning is conducted. The vehicle must, therefore, be driven by someone, which requires a least one person. In addition to a driver, a person at the far end of a communication link is needed to monitor the quality of the signal received from the vehicle and share his or her observations of the hands-free system audio with a second person in the vehicle, who manipulates various parameters of the hands-free system and monitors various measurements from the hands-free system in order to optimize the audio quality at the far end. A method and apparatus for remote tuning and operation of a diagnostic interface for a hands-free system would be an improvement over the prior art.

BRIEF SUMMARY

In accordance with embodiments of the invention, operating parameters of a hands-free audio system used with a wireless communication device in a moving vehicle are adjusted or tuned in real-time and requires only two persons: one to drive the vehicle and thus provide actual usage conditions with the hands-free audio system and one to remotely tune or adjust operating parameters to optimize far end audio quality. The system is remotely tuned by transmitting audio signals from the vehicle to the far end using a first communications link to the far end and sending adjustment commands to the vehicle from the far end via a second, data link between the far end and the vehicle. In one embodiment, DTMF signals received from inside or outside the vehicle can tune or be used to diagnose the hands-free system. Test measurements obtained from within and by the hands-free audio system can also be retrieved from a remote location.

DETAILED DESCRIPTION

Figure 1:
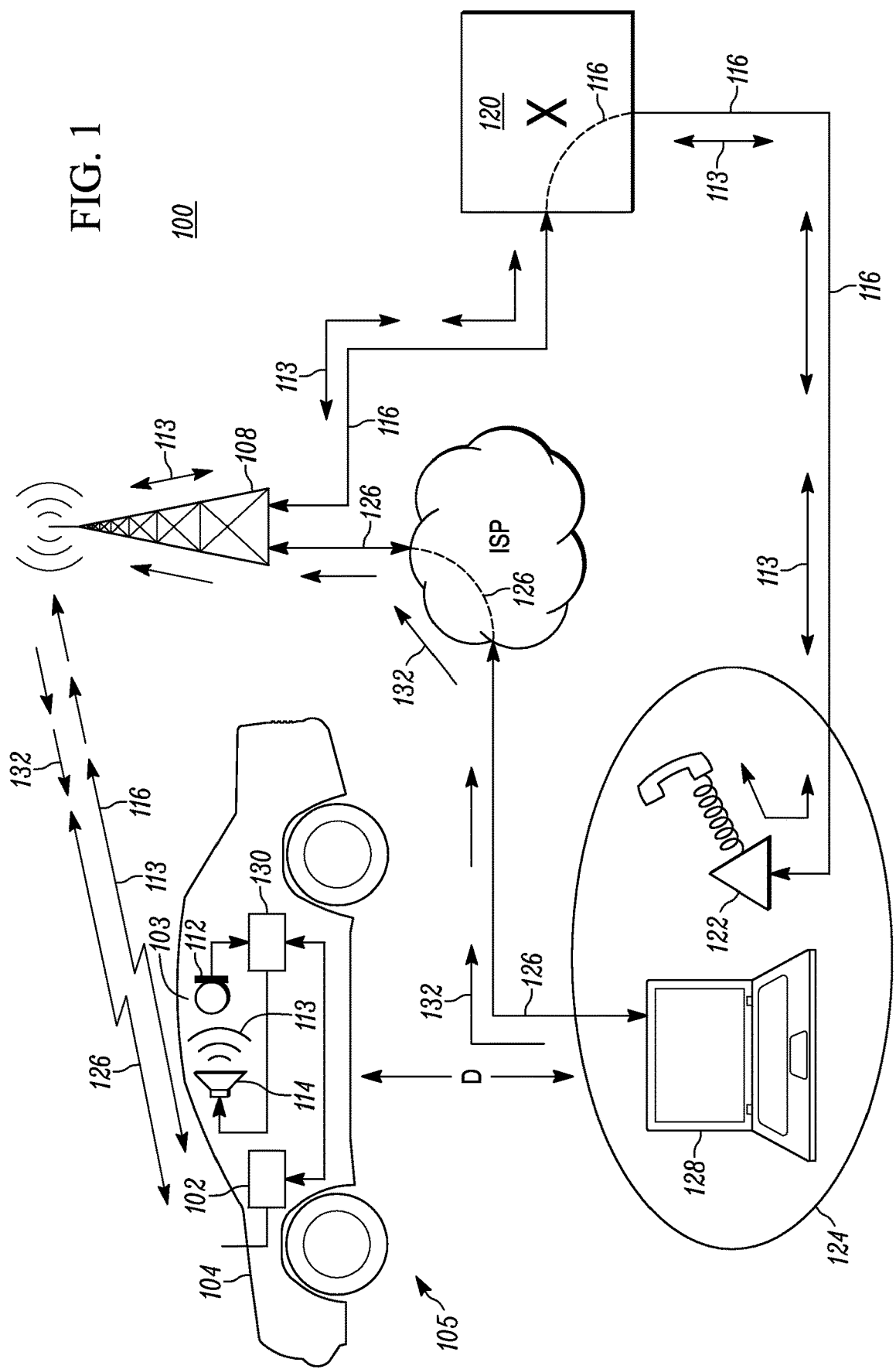
FIG. 1 is a block diagram of a system for adjusting operating parameters of a hands-free audio system used in a vehicle.

FIG. 1 depicts a system 100 for adjusting the operating parameters of a hands-free audio system, which is used with a wireless communications device 102 in a moving vehicle 104. The system 100 shown in FIG. 1 comprises a wireless communications device 102, usable by occupants of the passenger compartment or cabin of the moving vehicle 104. The wireless communications device 102 provides two-way wireless communications that include voice communications and data communications. Both forms of communications are facilitated by a wireless network 108 that is compatible with the wireless communications device 102.

In the vehicle 104, the hands-free audio system 105 comprises a microphone 112 or multiple microphones (only one shown) and a loudspeaker 114 or multiple loudspeakers (one shown). The microphone 112 transduces or "picks up" audio-frequency signals from within the passenger compartment or interior 103 of the vehicle 104 and provides electrical signals representing those audio signals to the wireless communications device 102 via a controller 130 for the hands-free audio system 105. The microphone 112 thus picks up road noise, wind noise, and engine noise caused by the vehicle being driven about as well as audio signals output from loudspeakers 114 in the cabin 103, including audio signals that are returned from the far end of a telecommunications path, such signals being referred to as "echo."

The loudspeaker 114 portion of the hands-free system 105 receives electrical signals in the audio-frequency range from the wireless communications device 102 via the controller 130 for the hands-free audio system 105. The loudspeaker 114 transduces those electrical signals into sound waves or audio signals 113 that can be heard throughout the passenger compartment 103 of the vehicle 104.

Audio signals 113 picked up by the microphone 112 are converted to electrical signals that are provided first to the controller 130. The electrical signals representing the audio signals are provided to the wireless communications device 102. The wireless communications device 102 transmits radio frequency signals containing the electrical signals obtained from the microphone to the wireless communications network 108 where they are routed from the network 108 to a conventional telephone switching system 120.

The telephone switching system or network 120 switches or routes the audio signals 113 obtained from the vehicle 104 to a conventional telephone handset 122, which is located at a distant location 124, i.e. a location remotely located away from the vehicle 104 at a distance, D. The voice-frequency communications 113 that take place between a person in the vehicle 104 and a person at the distant/remote location 124 thus takes place via a first communications link or channel identified in FIG. 1 by reference numeral "116."

In addition to the first wireless communications link 116, the system depicted in FIG. 1 establishes a second link identified by reference numeral "126." The second link 126 is established between the vehicle 104 and a computer 128 located at the remote location 124. The second link 126 carries bi-directional data, i.e., zeroes and ones, exchanged between the computer 128 at the remote location 124 and the hands-free audio system controller 130 located in the vehicle 104 and which is coupled to the wireless communications device 102 in the vehicle 104. The communications device 102 in the vehicle 104 is thus capable of both data communications and audio communications.

Information in the form of data can be exchanged between the wireless communications device 102 in the vehicle 104 and the computer 128 through the separate data link 126. Commands 132 for the hands-free audio system controller 130 can thus be provided to the controller 130 in the vehicle 104 from the computer 128 simply by sending the commands 132 to the controller 130 via the wireless communications device 102. Similarly, messages can be sent from the hands-free controller 130 to the remote computer 128. The second data link 126 thus allows the remote computer 128 to communicate with the hands-free controller 130 and vice versa.

In order to tune or adjust the hands-free system 105 from the remote location 124, a voice call is placed to the handset 122 at the remote location 124, or a voice call is placed to the wireless communications device 102 from the handset 122 at the remote location 124. A person using the handset 122 at the remote location 124 is thus able to hear noise and voice signals picked up by the hands-fee system in the vehicle 104. Such person is also able to detect echo that might be caused by the hands-free system 105.

Operational parameters of the hands-free system 105 can be changed by the person at the remote location 124 using the computer 128 that is coupled to the controller 130 for the hands-free system through the second data link 126 A person using the computer 128 can also send a message to the controller 130 in the vehicle 104, which causes the controller 130 to send a separate message or data back to the computer 128. A person using the computer 128 can thus query the controller 130 for information regarding hands-free system performance. Information that can be retrieved from controller 130 by way of a query sent to the controller 130 from the computer 128 can include, but is not limited to, data on echo return loss (ERL), which is a measure of the amplitude of the echo signal in the microphone 112, echo return loss enhancement (ERLE), which is a measure of the echo attenuation achieved by echo cancellation processes and a noise floor (NF) which is a measurement of the background noise level in the passenger compartment 103. Stated another way, the data connection to the hands-free audio system enables the transmission of commands to the wireless communications device 102 in the vehicle 104, which is coupled to the controller 130 for the hands-free system. The system 100 shown in FIG. 1 thus enables the remote configuration or tuning of a hands-free system in a moving vehicle using only two people: a driver for the vehicle and a technician at the remote location 124 who can change operating parameters of the hands-free audio system 110 in real time in order to optimize the performance of the hands-free system in the vehicle. The ability to send commands to the hands-free audio system 110 from the remote location 124 thus enables a person at the remote location to tune or adjust the hands-free audio system to his liking and remotely monitor key measurements from the hands-free system itself.

Figure 2:
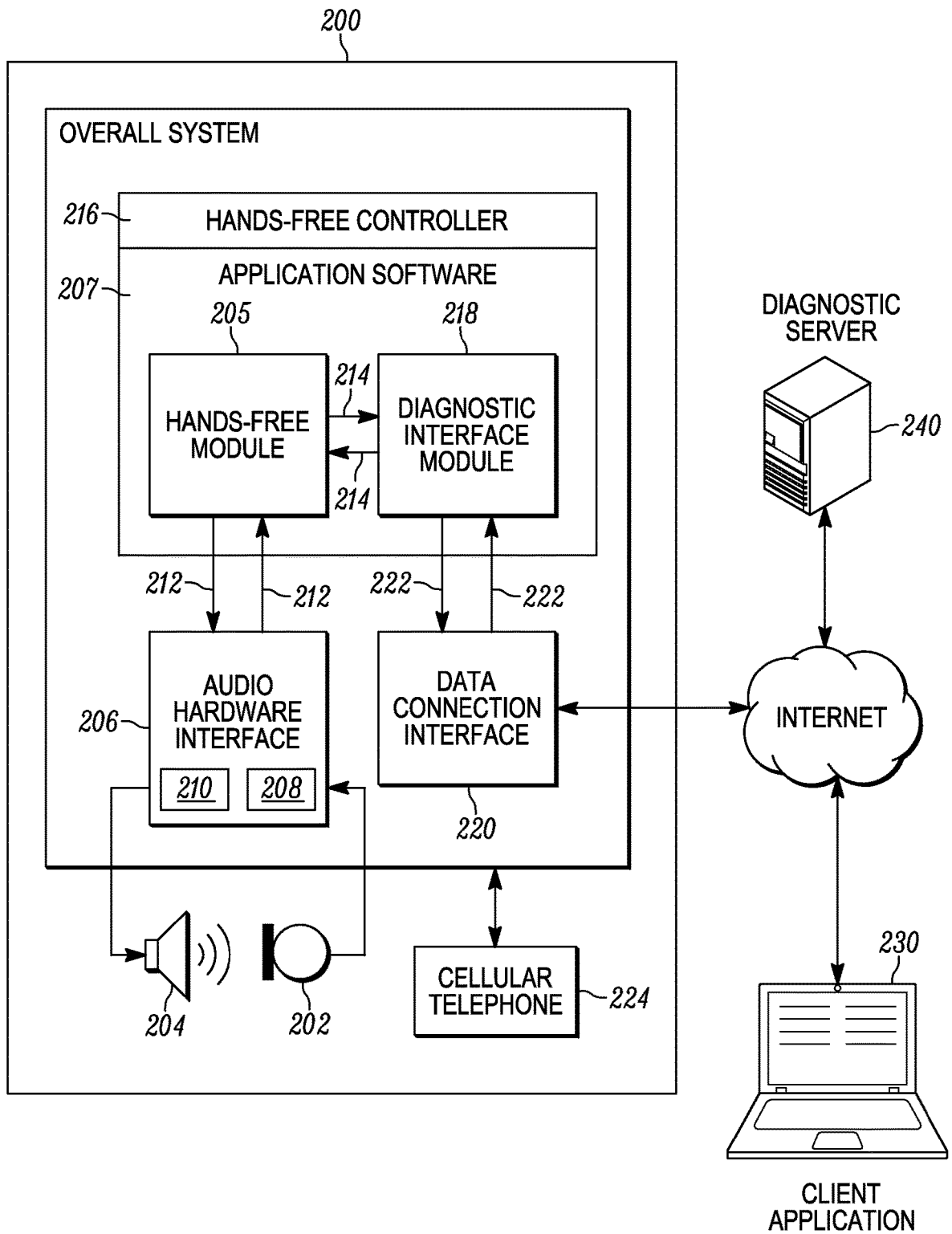
FIG. 2 is a block diagram of a first embodiment of an apparatus for remotely accessing a hands-free audio system and for adjusting operating parameters of a hands-free system used in a vehicle.

FIG. 2 is a block diagram of a first embodiment of an apparatus 200 for adjusting operating parameters of a hands-free audio system for a wireless communications device in a moving vehicle and which is capable of retrieving information from such a hands-free system. The apparatus 200 comprises a microphone 202, or multiple microphones, and a speaker 204, or multiple speakers, which are coupled to an audio hardware interface 206. For the microphone 202, the audio hardware interface 206 comprises a conventional analog-to-digital (A/D) convertor 208. The A/D converter 208 receives analog voltages and outputs binary numbers that represent the analog voltages. For the speaker 204 the interface 206 comprises a conventional digital-to-analog (D/A) convertor 210. The D/A converter receives binary numbers and outputs an analog voltage signal.

Digital signals 212 sent to and received from the audio hardware interface 206 from the microphone 202 and speaker 204 respectively are provided to a "hands-free module" 205, which in a preferred embodiment comprises one or more computer programs (computer program instructions and data or parameters) stored in a non-transitory memory device 207 that is coupled to a hands-free controller 216 embodied as a conventional microcontroller or microprocessor. When the program instructions 205 are executed, they cause the controller 216 to perform echo cancellation, echo suppression, and noise suppression operations on the digital data 212 that represents audio signals detected by the microphone 202, at least some of which are provided to the microphone 202 by the loud speaker 204.

A diagnostic interface module 218, also comprising computer program instructions, decodes the digital data 222 from the data connection interface 220 into a data format 214 that the hands-free module 205 can process. Additionally, the diagnostic interface module 218 can receive data 214 from the hands-free module 205 and encode and send that data 222 to the data connection interface 220.

The diagnostic interface module 218 is coupled to a data connection interface which is preferably embodied as digital data connection 222. It couples the hands-free controller 216 to a conventional cellular telephone 224.

The data connection interface 220 sends data signals to, and receives data signals from, a computer 230, not part of the apparatus 200 because it is located at a remote location. The data is exchanged between the computer 230 and the apparatus 200 via a data network, such as the Internet 232 and a wireless service provider not shown in FIG. 2.

A connection to a data network can be provided by a connection to a wireless communications network (not shown in FIG. 2) which is provided through the cell phone 224. Data signals received from the computer 230 can include commands to the hands-free system controller 216, which cause the controller 216 to collect hands-free system performance data and cause the controller 216 to send such information back to the computer 230 where it can be used to optimize the hands-free system.

A diagnostic server 240 handles connections from multiple remote computers to multiple vehicles. Each hands-free system in multiple vehicles registers with the server 240. When the "client" application to control a hands-free system in a vehicle is launched, on a remote computer 230 the computer's user can choose which vehicle to connect to. The server 240 will also maintain a log of all data sent back and forth between the hands-free system in a vehicle and the remote computer 230.

Figure 3:
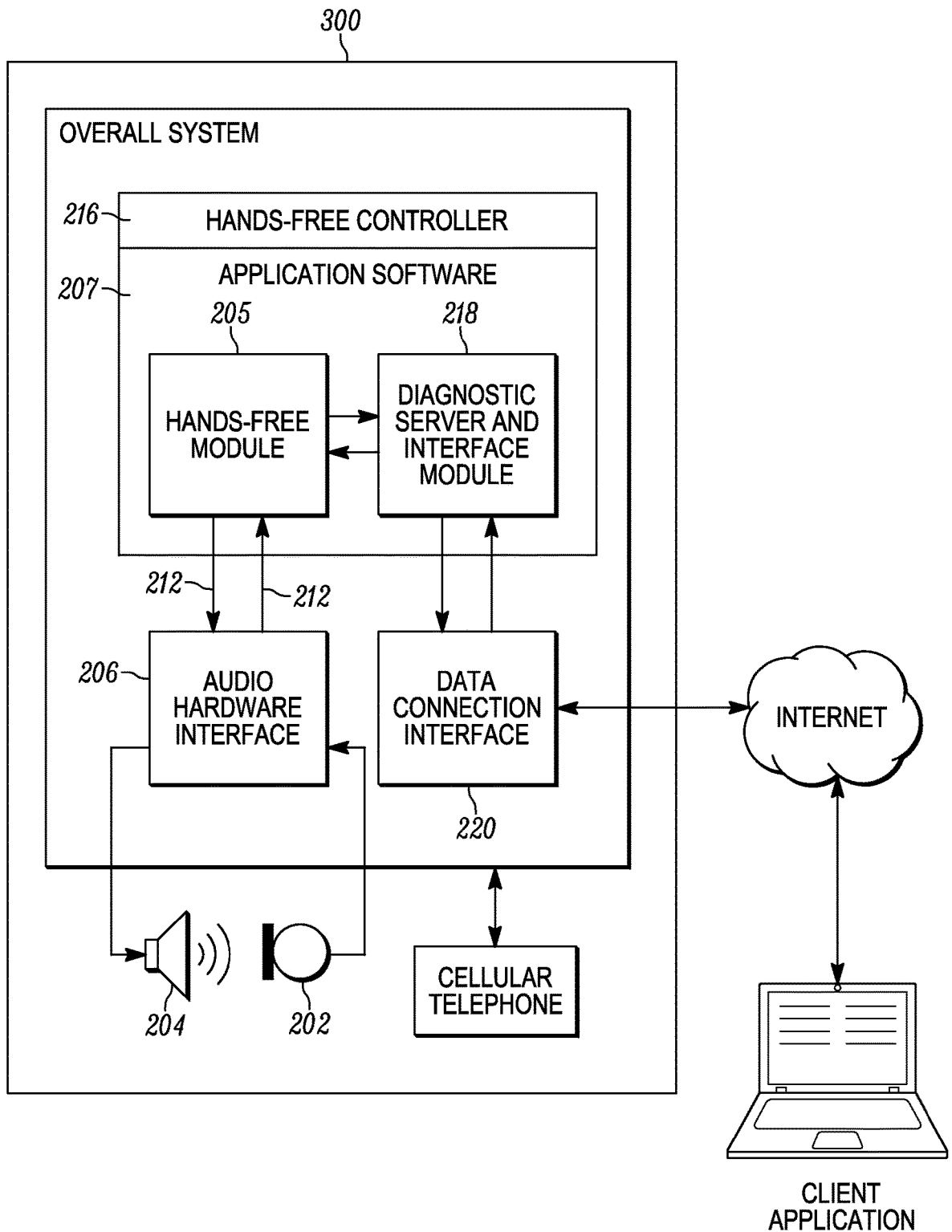
FIG. 3 is a block diagram of a preferred embodiment of a system for remotely accessing and adjusting operating parameters of a hands-free audio system used with a wireless communications device in a vehicle.

FIG. 3 depicts a preferred embodiment of an apparatus 300 for adjusting the operating parameters of a hands-free system used with a wireless communications device in a moving vehicle and for retrieving information from the hands-free system. The apparatus 300 depicted in FIG. 3 differs from the apparatus depicted in FIG. 2 by the absence of the diagnostic server 240. The apparatus 300 depicted in FIG. 3 is otherwise the same as the apparatus 200 shown in FIG. 2. Additional description of the elements shown in FIG. 3 is, therefore, omitted for brevity.

Figure 4:
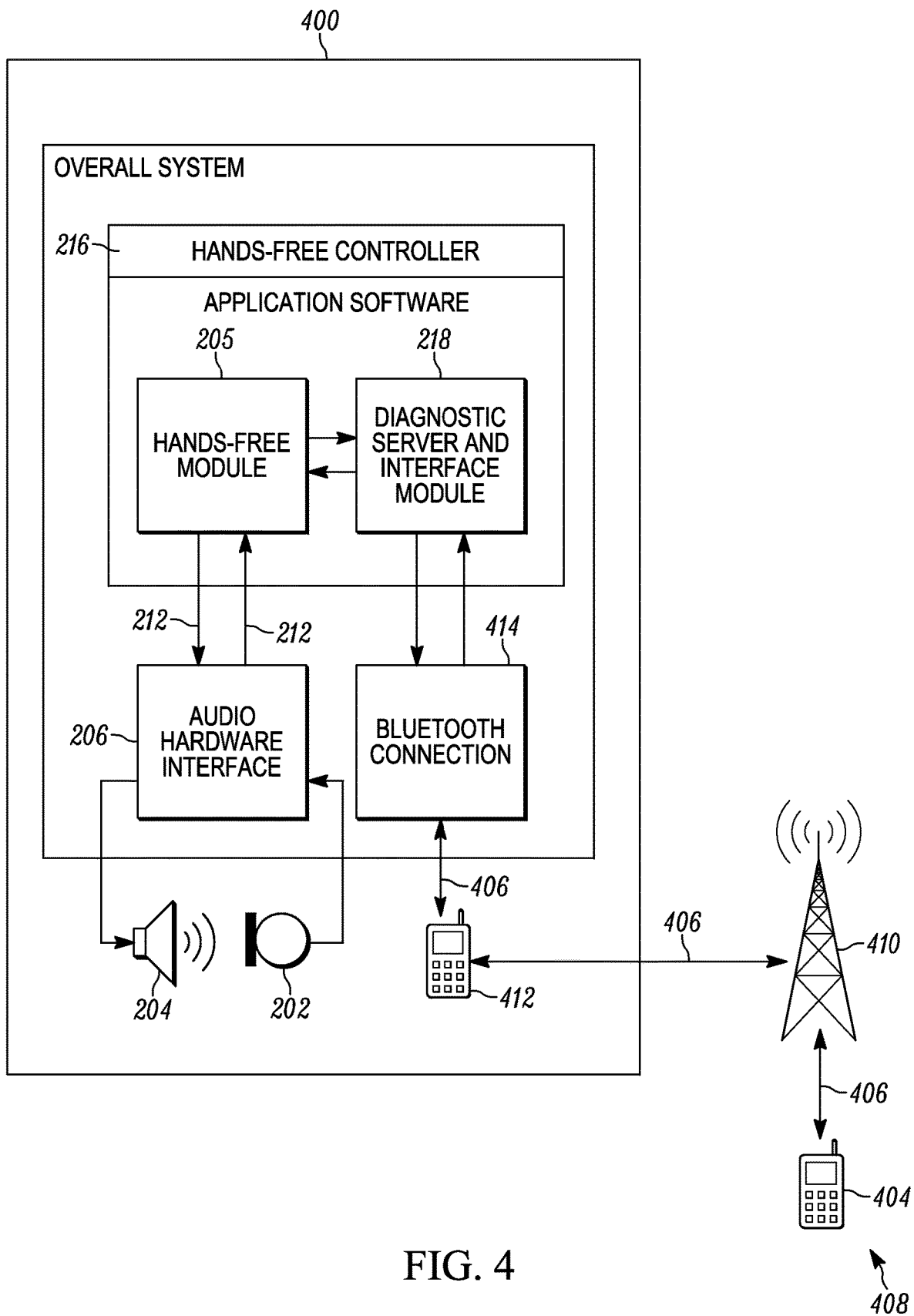
FIG. 4 is a block diagram of an alternate embodiment of a system for remotely accessing and adjusting operating parameters of a hands-free audio system used with a wireless communications device in a vehicle.

FIG. 4 is a block diagram of another alternate embodiment of an apparatus 400 for adjusting operating parameters of a hands-free audio system used with a wireless communications device in a moving vehicle and for retrieving information from the hands-free system. The hands-free system 400 is essentially the same as the hands-free system 200 shown in FIG. 2 and the hands-free system 300 shown in FIG. 3 except that in the embodiment shown in FIG. 4, commands are sent to the controller 216 for the hands-free system 400 as dual tone multi-frequency (DTMF) signals 406 that originate from a cell phone 404 that is typically located at a remote location 408 that is away from the vehicle where the hands-free system is being used.

DTMF signals 406 from the cell phone 404 are routed through a wireless communications network 410 to a second cell phone 412, which is coupled to the apparatus 400 through a Bluetooth transceiver 414 or other network access device (NAD) built into the vehicle but which is not a cell phone with, having, or using a Bluetooth link. The Bluetooth connection thus forwards the DTMF signals and the numbers they represent directly to the controller 216. The diagnostic and interface module 218, which is preferably implemented as computer program instructions, decodes the DTMF tones and constructs from them a series of digits. The alternate embodiment depicted in FIG. 4 thus enables changing or adjusting one or more operating parameters of a hands-free audio system in a moving vehicle from a remote location using either a conventional telephone or a cell phone.

Those of ordinary skill in the art will recognize that DTMF signals sent to the Bluetooth transceiver 414 from the far end cell phone 404 will be indistinguishable from DTMF signals sent to the Bluetooth transceiver 414 from the near end cell phone 412. In another alternate embodiment of the system 400 shown in FIG. 4, commands to adjust operating parameters of a hands-free audio system originate from a cell phone 412 inside the vehicle instead of a cell phone or conventional telephone located away from the vehicle. In such an embodiment, the controller 216 receives the same sequence of DTMF signals through the Bluetooth connection 414 and transfers the sequence of DTMF signals to the diagnostic and interface module 218, regardless of where the DTMF signals originate. The module 218 decodes the DTMF tones and constructs from them a series of digits.

Figure 5:
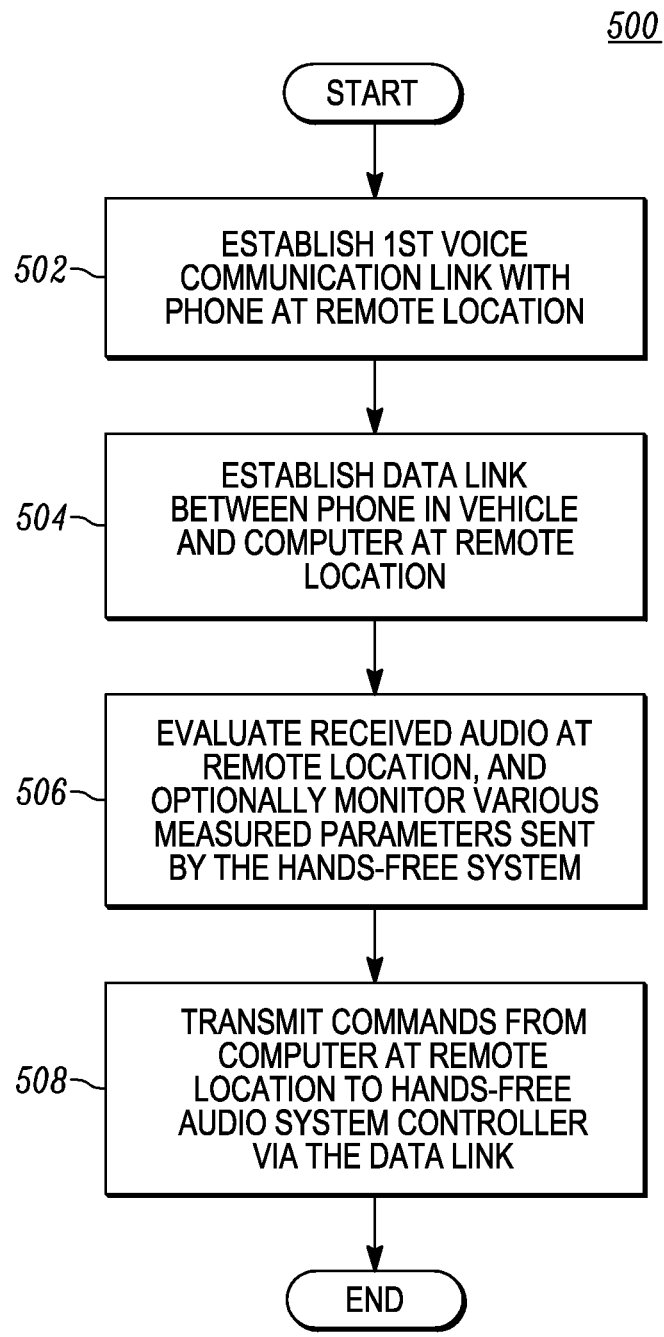
FIG. 5 is a flowchart showing steps of a method of remotely accessing and adjusting operating parameters of a hands-free audio system used with a wireless communications device in a vehicle.

FIG. 5 is a block diagram showing steps of a method 500 of remotely adjusting the operating parameters of a hands-free audio system used with a wireless communications device in a moving vehicle. At step 502, a voice communication link is established between the wireless communications device in the moving vehicle and a second communications device, such as a conventional telephone, located at a remote location away from the moving vehicle. As described above, the first communication link is a conventional voice path established with the hands-free audio system which will inherently pick up background noise, speech, and signals received from the remote location.

In step 504, a data link is established between the wireless communications device or cell phone in the vehicle and a computer at the remote location. For the embodiment shown in FIG. 4, however, a data link is not required. The data link enables the computer at the remote location to send commands to the phone in the vehicle, which is coupled to the controller for the hands-free audio system. Commands from the remote location can thus be sent to the controller for the hands-free audio system enabling the remote location to take direct control of the controller for the hands-free audio system and adjust its operation based upon received audio at the remote location and measurements sent by the hands-free system to the remote user.

After the voice channel is established in step 502 and after the data link is established in step 504, the method 500 thereafter simply requires a person at the remote location to monitor the quality of audio signals received from the vehicle and monitor various measurements received from the hands-free system. Step 506 thus depicts the evaluation of received audio at the remote location by a user or in an alternate embodiment, a computer provided with appropriate audio processing circuitry well known to those of ordinary skill in the art.

Finally, at step 508, using a computer, a person at the remote location transmits commands from the computer to the controller for the audio system in the vehicle using the data link. The user at the remote location is thus able to tune or align the parameters of the hands-free system to optimize audio quality in real time.

Figure 6:
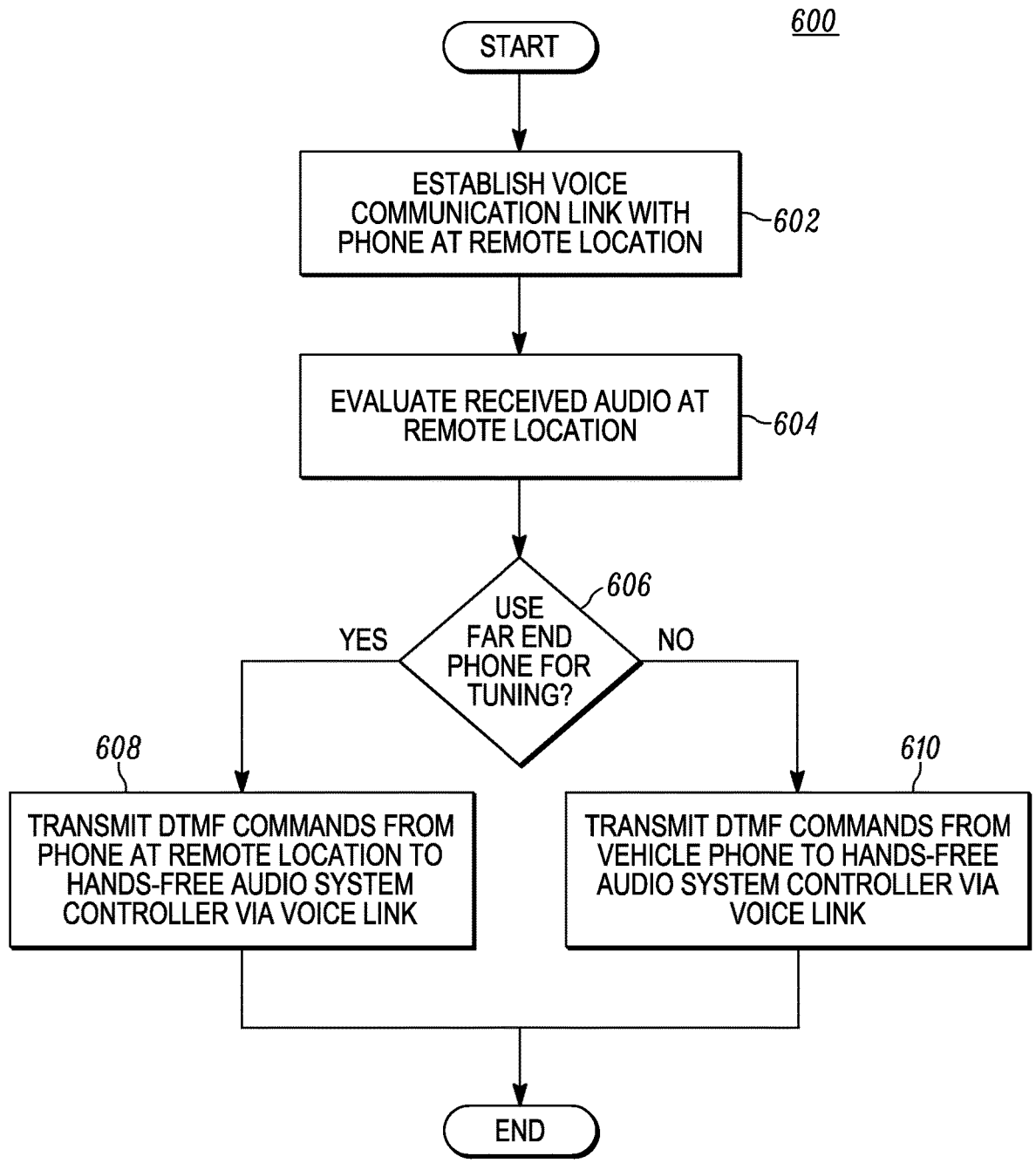
FIG. 6 is a flowchart showing an alternate method of accessing and adjusting operating parameters of a hands-free audio system used with a wireless communication device in a vehicle.

FIG. 6 is a block diagram showing steps of a method 600 of remotely or locally adjusting the operating parameters of a hands-free audio system using DTMF signals, e.g., from within the vehicle using a cell phone inside the vehicle or from a distant location using a cell phone, conventional telephone, or a DTMF tone generator. At step 602, a voice communication link is established between the wireless communications device in the moving vehicle and a second communication device, such as a conventional telephone, located at a remote location away from the moving vehicle.

At step 604, the audio at the remote location is evaluated by a person at the remote location listening to the audio transmitted from the vehicle. Based on the quality of the audio at the remote location, commands to adjust the hands-free system might be given to adjust the hands free system.

At step 606, a decision is made whether to adjust the hands-free system from inside the vehicle or from a remote location. At step 608, commands to adjust the hands-free system, embodied as one or more DTMF tones, are sent to the hands-free system from a remote location via the voice link established at step 602. Alternatively, commands to adjust the hands-free system are sent to the hands-free system from a near location, e.g., a cell phone in the vehicle. In either case, commands to adjust the hands-free system are sent to the system in the form of DTMF signals.

DTMF signals are well known to those of ordinary skill in the telephone art. Those of ordinary skill in the art also know that DTMF signals can be generated by conventional telephones and cell phones as well as test equipment that is specifically designed to generate DTMF signals. The term "DTMF signal generator" should therefore be construed to include a conventional telephone, a cell phone, as well as any other device that can generate DTMF tones.

In each embodiment described above, the commands sent from the computer at the remote location to the controller for the hands-free audio system include information or instruction that causes the controller for the hands-free audio system to change parameters or data used by one or more control algorithms for the hands-free audio system. Such algorithms are provided by the controller for the hands-free audio system executing program instructions stored in non-transitory memory that is coupled to the controller. Digital signal processing algorithms cause the controller to process digital signal signals to change, for example, a noise attenuation factor, change a digital filter cut-off frequency or change a digital delay time that is provided by the hands-free audio system between signals detected at a microphone and that are broadcast from a loud speaker in the vehicle. Other algorithms can cause the controller to change other parameters.

The foregoing description is for purposes of illustration only. The true scope of the invention is set forth in the following claims.

The invention claimed is:

1. A method of remotely tuning a hands-free audio system used with a wireless communication device in a moving vehicle, which is being driven by a first person, the wireless communications device being operatively coupled to a controller for the hands-free audio system and which controls the hands-free audio system, the method comprising:
   using a first wireless communications link to establish a voice telephone call between the first person, who is driving the moving vehicle, and a second person who is at a first remote location distant from the moving vehicle;
   transducing audio signals in the moving vehicle using the hands-free audio system located in the moving vehicle to provide a signal representing said audio signals in the moving vehicle being driven by the first person, wherein the audio signals include speech of the telephone call between the first person and the second person;
   transmitting the signal representing said audio signals to a remotely-located communications device using the first wireless communications link, the remotely-located communications device being at the first remote location;
   generating audio signals by said remotely-located communications device using said signal representing said audio signals;
   monitoring audio signals generated by the remotely-located communications device and evaluating the audio signals generated by the remotely-located communications device to determine a quality of said audio signals, the steps of monitoring and evaluating being performed by the second person, who is at said first remote location;
   transmitting a command from the first remote location to the hands-free audio system using a second wireless communications link, the second wireless communications link being different from the first wireless communications link, the command that is transmitted to the hands-free audio system being selected by said second person in order to change an operating parameter of the hands-free audio system in order to change the audio quality at the remote location as perceived by the second person.

2. The method of claim 1, wherein the step of transmitting a command selected by the second person comprises the step of selecting a command to send at a computer that is coupled to a wireless network by the second wireless communications link but which is not coupled to the wireless network by the first wireless communications link.

3. The method of claim 1, wherein the step of transmitting a command to the hands-free audio system comprises: transmitting a series of dual-tone, multi-frequency (DTMF) signals over the second wireless communications link.

4. The method of claim 1, wherein the step of transducing audio signals comprises: detecting near-end speech that is obtained from inside the vehicle, detecting acoustic noise in the vehicle and detecting far-end speech provided by a loudspeaker in the vehicle.

5. The method of claim 1, wherein the command transmitted to the hands-free audio system causes the controller for the hands-free audio system to change a control algorithm for the hands-free audio system.

6. The method of claim 3, wherein the data signal received at the vehicle comprises information that causes the controller for the hands-free audio system to change a noise attenuation factor.

7. The method of claim 3, wherein the data signal comprises information that causes the controller for the hands-free audio system to change an audio filter cutoff frequency.

8. The method of claim 3, wherein the data signal comprises information that causes the controller for the hands-free audio system to change a delay time provided between a loud speaker in the vehicle and a microphone in the vehicle.

9. The method of claim 2, further comprising:
   transmitting a command to a controller for the hands-free system via the second wireless communications link, said command causing the controller to collect information from the hands-free system and transmit said collected information via, at least one of, the first and second wireless communications links.

\* \* \* \* \*